(12) United States Patent
Rittenhouse, Jr.

(10) Patent No.: US 12,269,597 B2
(45) Date of Patent: Apr. 8, 2025

(54) DUAL TRACK LIGHT-LIMITING HEADER ASSEMBLY

(71) Applicant: The Boeing Company, Chicago, IL (US)

(72) Inventor: Timothy D. Rittenhouse, Jr., Summerville, SC (US)

(73) Assignee: THE BOEING COMPANY, Arlington, VA (US)

( * ) Notice: Subject to any disclaimer, the term of this patent is extended or adjusted under 35 U.S.C. 154(b) by 219 days.

(21) Appl. No.: 17/825,091

(22) Filed: May 26, 2022

(65) Prior Publication Data

US 2023/0382533 A1 Nov. 30, 2023

(51) Int. Cl.
*B64D 11/06* (2006.01)
*B64D 11/00* (2006.01)

(52) U.S. Cl.
CPC ...... *B64D 11/0606* (2014.12); *B64D 11/0023* (2013.01)

(58) Field of Classification Search
CPC ............ B64D 11/0023; B64D 11/0606; B64D 2011/0046
See application file for complete search history.

(56) References Cited

U.S. PATENT DOCUMENTS

| | | | | |
|---|---|---|---|---|
| 6,189,831 | B1* | 2/2001 | Asai | B64D 11/0023 454/76 |
| 8,684,308 | B2* | 4/2014 | Warner | B64D 11/0023 244/118.5 |
| 10,829,217 | B2 | 11/2020 | Maclay et al. | |
| 2006/0032155 | A1* | 2/2006 | Thomassin | B64D 11/0023 52/36.2 |
| 2009/0242147 | A1* | 10/2009 | Breuer | B64D 25/16 160/368.1 |
| 2017/0009504 | A1* | 1/2017 | Colacecchi | A47H 1/04 |
| 2018/0319502 | A1* | 11/2018 | Maclay | B64D 11/00 |
| 2021/0291955 | A1* | 9/2021 | Breigenzer | E06B 5/125 |

* cited by examiner

*Primary Examiner* — Christopher D Hutchens
(74) *Attorney, Agent, or Firm* — COATS & BENNETT, PLLC

(57) ABSTRACT

A header assembly for an aircraft cabin comprises a plurality of track, each track configured to engage with separate movable panel made from an opaque material, with the separate movable panels deployed within the header assembly tracks to form an enclosed space defined by the deployed moveable panels, and with the movable panels made from an opaque material to block light from entering an adjacent region of an aircraft cabin interior.

23 Claims, 10 Drawing Sheets

FIG. 2B

DUAL TRACK LIGHT-LIMITING HEADER ASSEMBLY

TECHNOLOGICAL FIELD

The present disclosure relates generally to the field of fixtures for separating cabin sections. More specifically, the present disclosure relates to the field of light-limiting header sections for devices configured to enclose cabin areas of, for example, aircraft cabins.

BACKGROUND

In commercial air travel on passenger aircraft, the comfort of the passengers is paramount. Attempts to regulate ambient light during flight has included dimming or otherwise regulating light levels within a passenger cabin. Regular functioning of the crew, however, can necessitate certain light levels within crew working areas (e.g., galleys, etc.) that may be considered as excessive light within a passenger cabin that could, for example, interrupt a passenger's sleep. Further, one of two adjacent passenger cabin types (e.g., first class, business class, economy class, etc.) may each have varying light levels maintained within a particular passenger cabin type. In addition, the movement by a passenger to an aircraft lavatory located adjacent to a lit crew work area and located adjacent varying passenger cabin types could require a barrier to be moved that might otherwise be in position to partially restrict light from entering an aircraft cabin (e.g., from an adjacent cabin).

Unless explicitly identified as such, no statement herein is admitted as prior art merely by its inclusion in the Technological Field and/or Background section.

SUMMARY

Present aspects are directed to establishing and maintaining desired ambient light levels within and between and among aircraft cabins, sections or regions of aircraft cabins, varying aircraft cabin types, etc., including, for example, through physically regulating and/or impeding the passage of light from one cabin area to another cabin area.

Present aspects regulate and/or impede light passage between and among passenger aircraft cabins by employing a header assembly and by employing an aircraft cabin assembly comprising a header assembly configured to support a plurality of movable barriers relative to the header assembly, with the plurality of movable barriers (referred to equivalently herein as "movable partitions") in communication with the header assembly, and with the plurality of movable barriers each independently movable through a range of positions from a fully deployed light-blocking position to a stowed position.

According to a present aspect, a header assembly apparatus is disclosed, with the apparatus comprising a header assembly dimensioned to abut an aircraft cabin inboard structure and with the header assembly further dimensioned to abut an aircraft cabin outboard structure, with the inboard and outboard structures positionable adjacent an aisle separating the inboard and outboard structures from one another. The header assembly is further positioned adjacent to an aircraft cabin ceiling with the header assembly further positionable between the inboard and outboard structures to form a header assembly/aircraft cabin ceiling interface. The header assembly includes a main body, with the main body formed from a solid and non-porous material. The main body includes a base panel, with the base panel including a base panel first side, a base panel second side, and with the base panel including a base panel thickness. The base panel first side is exposed to and otherwise faces into an aircraft cabin. The base panel first side includes a plurality of recesses, with the plurality of recesses configured to form at least a first track and a second track, with the first track and the second track spaced a selected distance apart from one another.

In another aspect, the base panel further includes a base panel through opening, with the base panel through opening configured to extend through the base panel thickness, with the base panel through opening positioned between the first track and second track.

In another aspect, the header assembly is formed from an opaque material.

In another aspect, at least one of the first track and second track comprises a linear geometry.

In another aspect, at least one of the first track and second track comprises an arcuate geometry.

In a further aspect the first track comprises a linear geometry and the second track comprises an arcuate geometry.

In another aspect, the header assembly is configured to contact the aircraft cabin ceiling, with the header assembly further configured to extend a selected distance from the aircraft cabin ceiling between the aircraft cabin inboard structure and the aircraft cabin outboard structure.

In another aspect, the base panel second side includes at least four anchoring members, with the at least four anchoring members configured to attach the header assembly to a support structure, with the support structure positioned proximate to the base panel second side, and with the support structure further including at least four attachment points, each of said four attachment points configured to engage with one of the at least four anchoring members.

According to another present aspect, an aircraft is disclosed, with the aircraft including a header assembly dimensioned to abut an aircraft cabin inboard structure and with the header assembly further dimensioned to abut an aircraft cabin outboard structure, with the inboard and outboard structures positioned adjacent an aisle separating the inboard and outboard structured from one another. The header assembly further positioned adjacent to an aircraft cabin ceiling with the header assembly further positionable between the inboard and outboard structures to form a header assembly aircraft cabin ceiling interface. The header assembly includes a main body, with the main body formed from a solid and non-porous material. The main body includes a base panel, with the base panel including a base panel first side, a base panel second side, and with the base panel including a base panel thickness. The base panel first side is exposed to and otherwise faces into an aircraft cabin. The base panel first side includes a plurality of recesses, with the plurality of recesses configured to form at least a first track and a second track, with the first track and the second track spaced a selected distance apart from one another.

In another aspect, the base panel further includes a base panel through opening, with the base panel through opening configured to extend through the base panel thickness, with the base panel through opening positioned between the first track and second track.

According to a further present aspect, an aircraft cabin assembly is disclosed, with the aircraft cabin assembly including an aircraft cabin inboard structure located within an aircraft cabin, with the aircraft cabin inboard structure adjoining an aircraft cabin aisle, and an aircraft cabin outboard structure located within the aircraft cabin, with the aircraft cabin outboard structure adjoining the aircraft cabin aisle with the aircraft cabin outboard structure positioned at a selected distance across from the aircraft cabin inboard structure, and with the aircraft cabin outboard structure separated from said aircraft cabin inboard structure by the aircraft cabin aisle, and with the aisle comprising an aisle width. The aircraft cabin assembly further includes a header assembly, with the header assembly dimensioned to abut the aircraft cabin inboard structure, and with the header assembly further dimensioned to abut the aircraft cabin inboard structure and with the header assembly further dimensioned to abut aircraft cabin ceiling to form a header assembly/aircraft cabin ceiling interface between the aircraft cabin ceiling and the header assembly. The header assembly includes a main body, with the main body formed from a solid and non-porous material. The main body includes a base panel, with the base panel including a base panel first side, a base panel second side, and with the base panel including a base panel thickness. The base panel first side is exposed to and otherwise faces into an aircraft cabin. The base panel first side includes a plurality of recesses, with the plurality of recesses configured to form at least a first track and a second track, with the first track and the second track spaced a selected distance apart from one another.

In another aspect, the base panel further includes a base panel through opening, with the base panel through opening configured to extend through the base panel thickness, with the base panel through opening positioned between the first track and second track. The aircraft cabin assembly further includes a first movable partition configured to movably engage and extend downward from the first track, and a second movable partition configured to moveable engage and extend downward from the second track.

According to a further aspect, the aircraft cabin assembly further comprises an oxygen drop down assembly positioned adjacent the base panel second side, with the oxygen drop down assembly including an oxygen drop down delivery device, wherein said base panel through opening is dimensioned and otherwise configured to accommodate and permit passage of the oxygen drop down delivery device through the base panel through opening on demand.

In another aspect, the aircraft cabin assembly further includes a seal, with the seal configured to substantially cover the header assembly/aircraft cabin ceiling interface.

In another aspect, header assembly is formed from an opaque material.

In a further aspect, at least one of the first movable partition and the second movable partition comprises a curtain.

In another aspect, the selected distance between the inboard structure and the outboard structure is approximately equivalent to an aircraft aisle width.

In a further aspect, the first movable partition further includes a first movable partition first end and a first movable partition second end, and the first movable partition first end is configured to be in direct or indirect communication with the first track of the header assembly and the first movable partition second end is configured to extend a distance from the first movable partition first end, with the first partition second end further configured to at least nearly contact an aircraft cabin floor section.

In another aspect, the second movable partition further comprising a second movable partition first end and a second movable partition second end, with the second movable partition first end configured to be in direct or indirect communication with the second track of the header assembly, with the second movable partition second end configured to extend a distance from the second movable partition first end, and with the second partition second end further configured to at least nearly contact an aircraft cabin floor section.

According to a further aspect, an aircraft is disclosed, with the aircraft including the aircraft cabin assembly including an aircraft cabin inboard structure located within an aircraft cabin, with the aircraft cabin inboard structure adjoining an aircraft cabin aisle, and an aircraft cabin outboard structure located within the aircraft cabin, with the aircraft cabin outboard structure adjoining the aircraft cabin aisle with the aircraft cabin outboard structure positioned at a selected distance across from the aircraft cabin inboard structure, and with the aircraft cabin outboard structure separated from said aircraft cabin inboard structure by the aircraft cabin aisle, and with the aisle comprising an aisle width. The aircraft cabin assembly further includes a header assembly, with the header assembly dimensioned to abut the aircraft cabin inboard structure, and with the header assembly further dimensioned to abut the aircraft cabin inboard structure and with the header assembly further dimensioned to abut aircraft cabin ceiling to form a header assembly/aircraft cabin ceiling interface between the aircraft cabin ceiling and the header assembly. The header assembly includes a main body, with the main body formed from a solid and non-porous material. The main body includes a base panel, with the base panel including a base panel first side, a base panel second side, and with the base panel including a base panel thickness. The base panel first side is exposed to and otherwise faces into an aircraft cabin. The base panel first side includes a plurality of recesses, with the plurality of recesses configured to form at least a first track and a second track, with the first track and the second track spaced a selected distance apart from one another. The base panel further can include a base panel through opening, with the base panel through opening configured to extend through the base panel thickness, with the base panel through opening positioned between the first track and second track. The aircraft cabin assembly further includes a first movable partition configured to movably engage and extend downward from the first track, and a second movable partition configured to moveable engage and extend downward from the second track.

According to a further present aspect, a method for impeding light passage from a first aircraft cabin area to a second aircraft cabin is disclosed, with the method including installing an aircraft header assembly between an aircraft cabin inboard structure located within an aircraft cabin, said aircraft cabin inboard structure positioned adjacent to an aircraft cabin aisle, with an aircraft cabin outboard structure located within the aircraft cabin, with the aircraft cabin outboard structure positioned adjacent to the aircraft cabin aisle, with the outboard structure separated by the aircraft cabin aisle within the said aircraft cabin, and with the aircraft cabin aisle comprising an aircraft aisle width. The aircraft header assembly is dimensioned to abut the aircraft cabin inboard structure, said header assembly further dimensioned to abut the aircraft cabin inboard structure, said header assembly further dimensioned to abut aircraft cabin ceiling between the aircraft cabin inboard structure and the aircraft cabin outboard structure to form a header assembly/aircraft cabin ceiling interface between the aircraft cabin ceiling and said header assembly. The aircraft header assembly includes a main body, with the main body formed from a solid and non-porous material. The main body includes a base panel, with the base panel including a base panel first side, a base panel second side, and with the base panel including a base panel thickness. The base panel first side is exposed to and otherwise faces into an aircraft cabin. The base panel first side includes a plurality of recesses, with the plurality of recesses configured to form at least a first track and a second track, with the first track and the second track spaced a selected distance apart from one another.

In another aspect, the base panel further includes a base panel through opening, with the base panel through opening configured to extend through the base panel thickness, with the base panel through opening positioned between the first track and second track. The aircraft header assembly further includes a first movable partition configured to movably engage and extend downward from the first track and a second movable partition configured to moveably engage and extend downward from the second track. The method further includes deploying at least one of the first movable partition and the second movable partition from a stowed position to a deployed position, and impeding passage of ambient light from one aircraft cabin area to a second aircraft cabin area.

A present method further includes deploying both the first movable partition and the second movable partition from a stowed configuration to a deployed configuration, and forming a sealed off area within the aircraft cabin, said sealed off area defined by the first movable partition in the deployed position and the second movable partition in the deployed position.

A further present method includes deploying an oxygen drop down delivery device through the base panel through opening.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
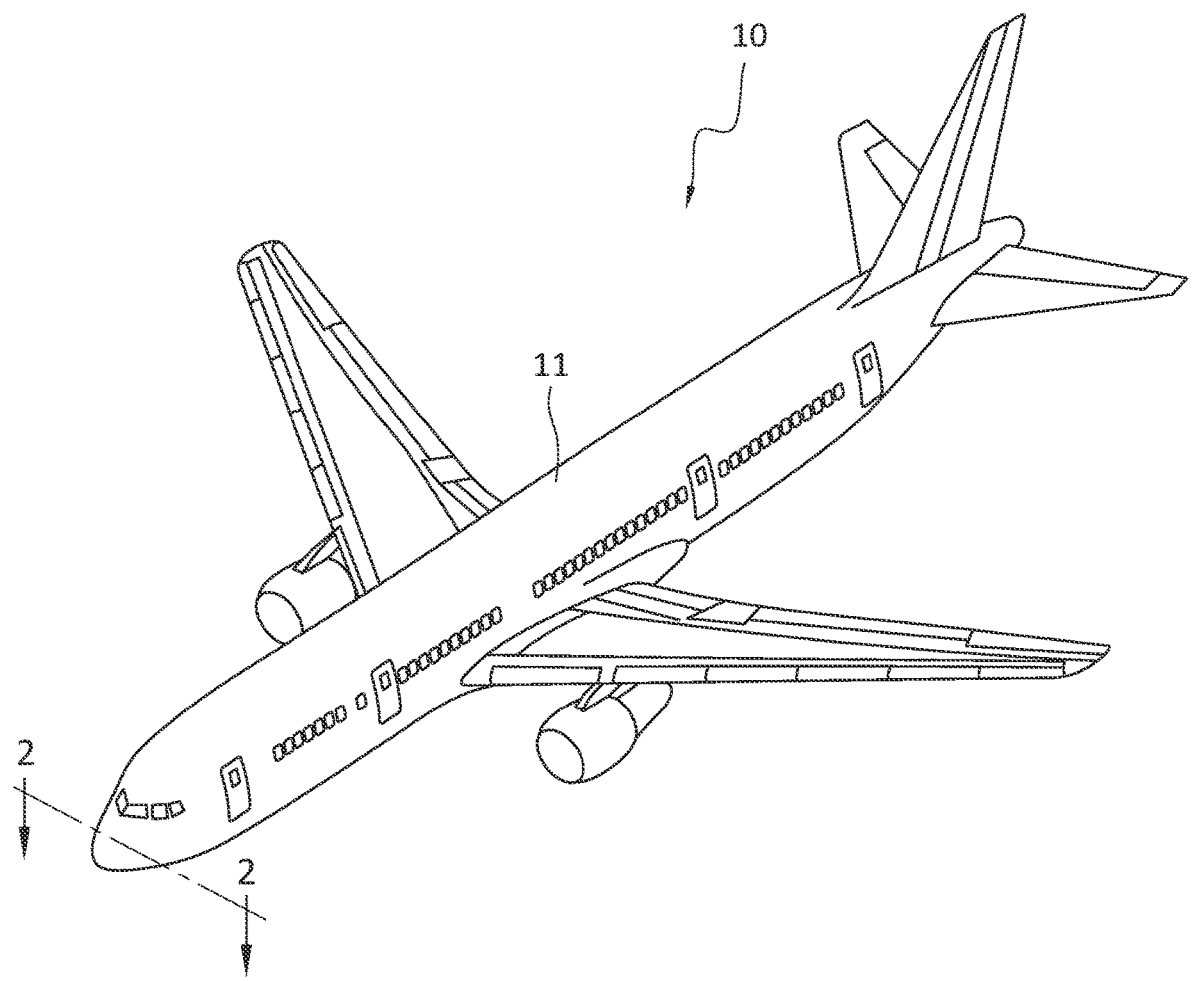
Figure 2A:
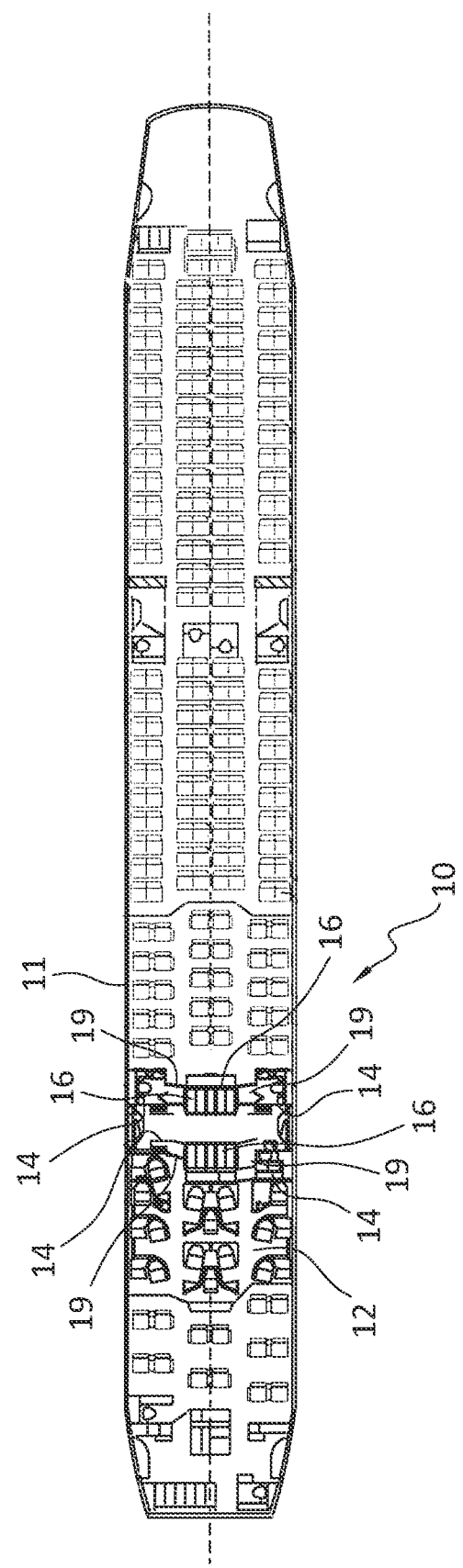
Figure 2B:
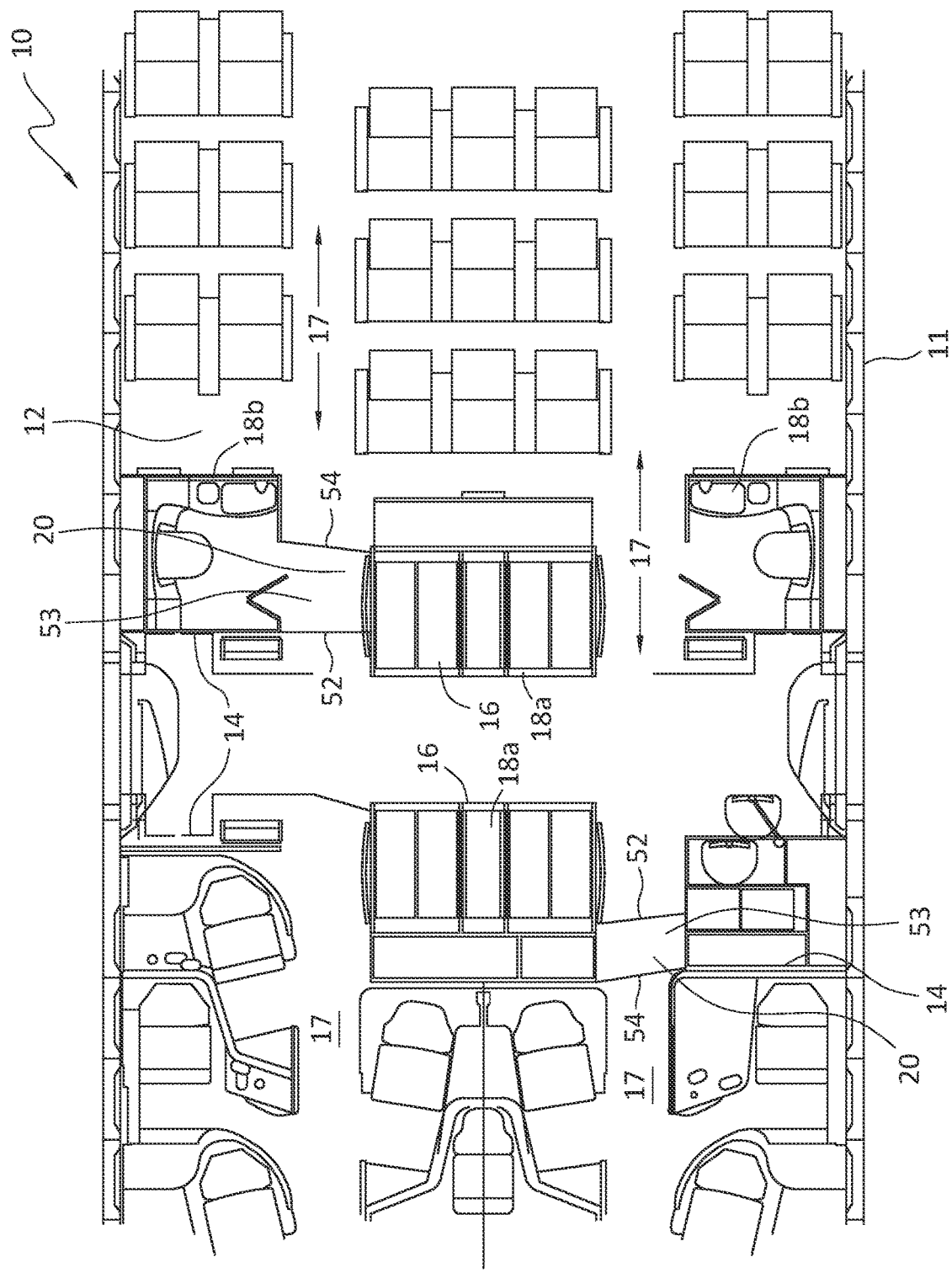
Figure 3:
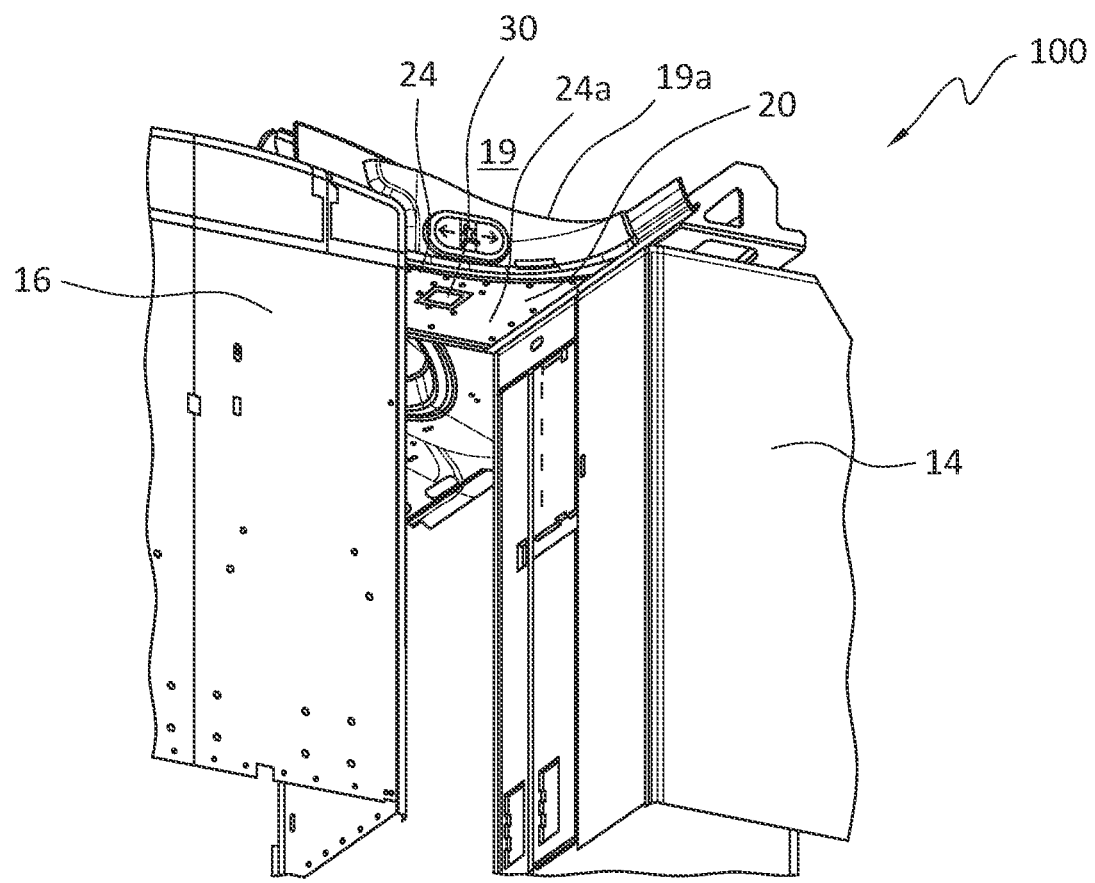
Figure 4A:
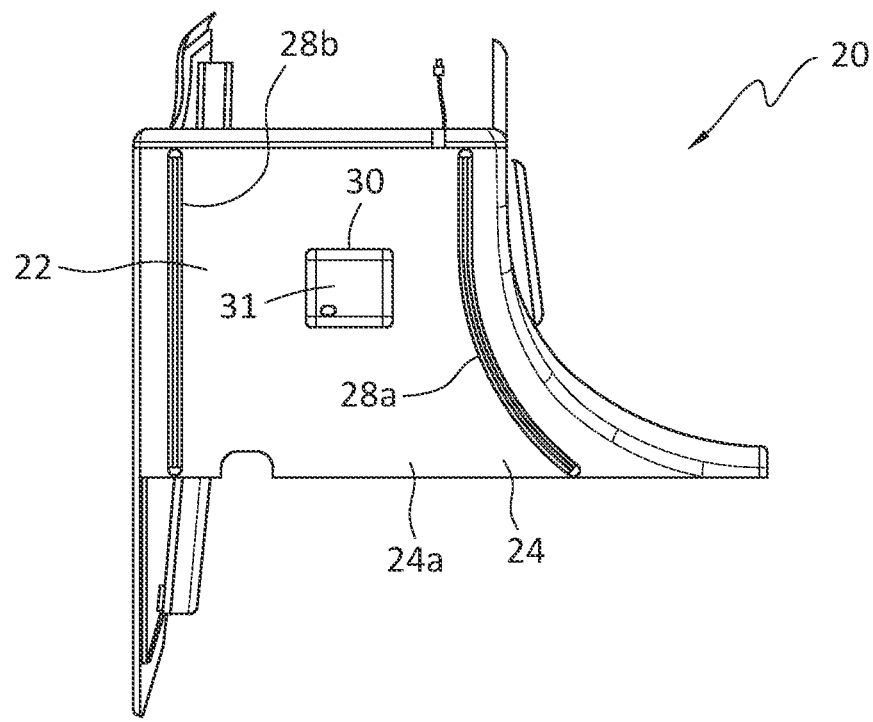
Figure 4B:
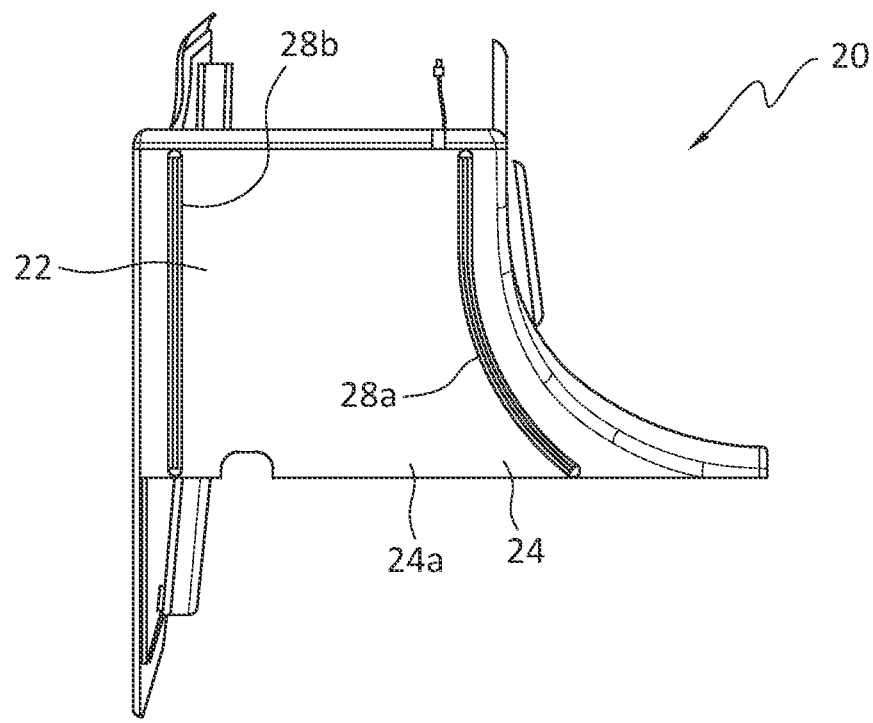
Figure 5:
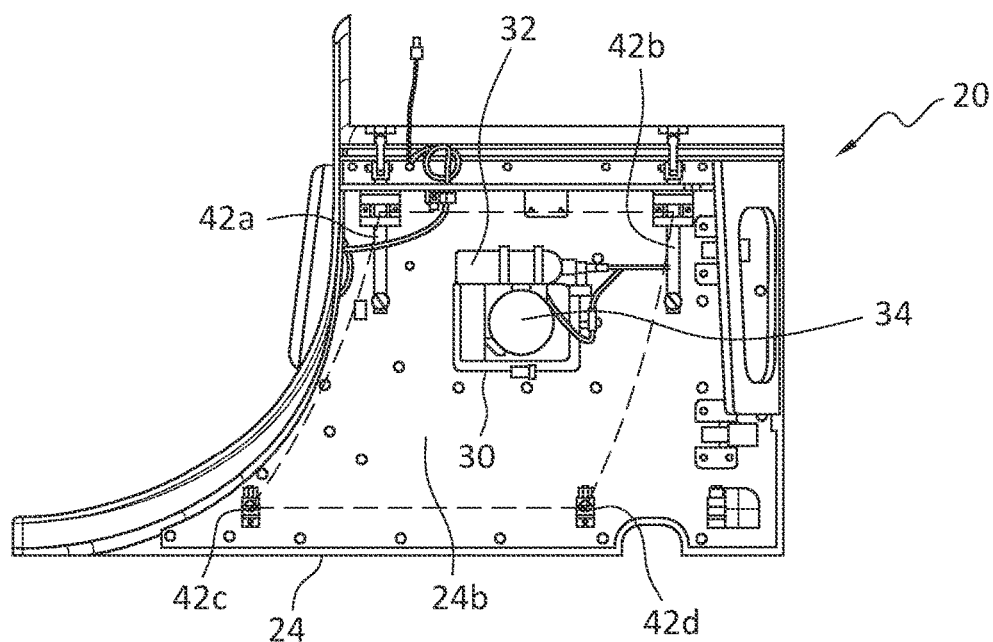
Figure 6:
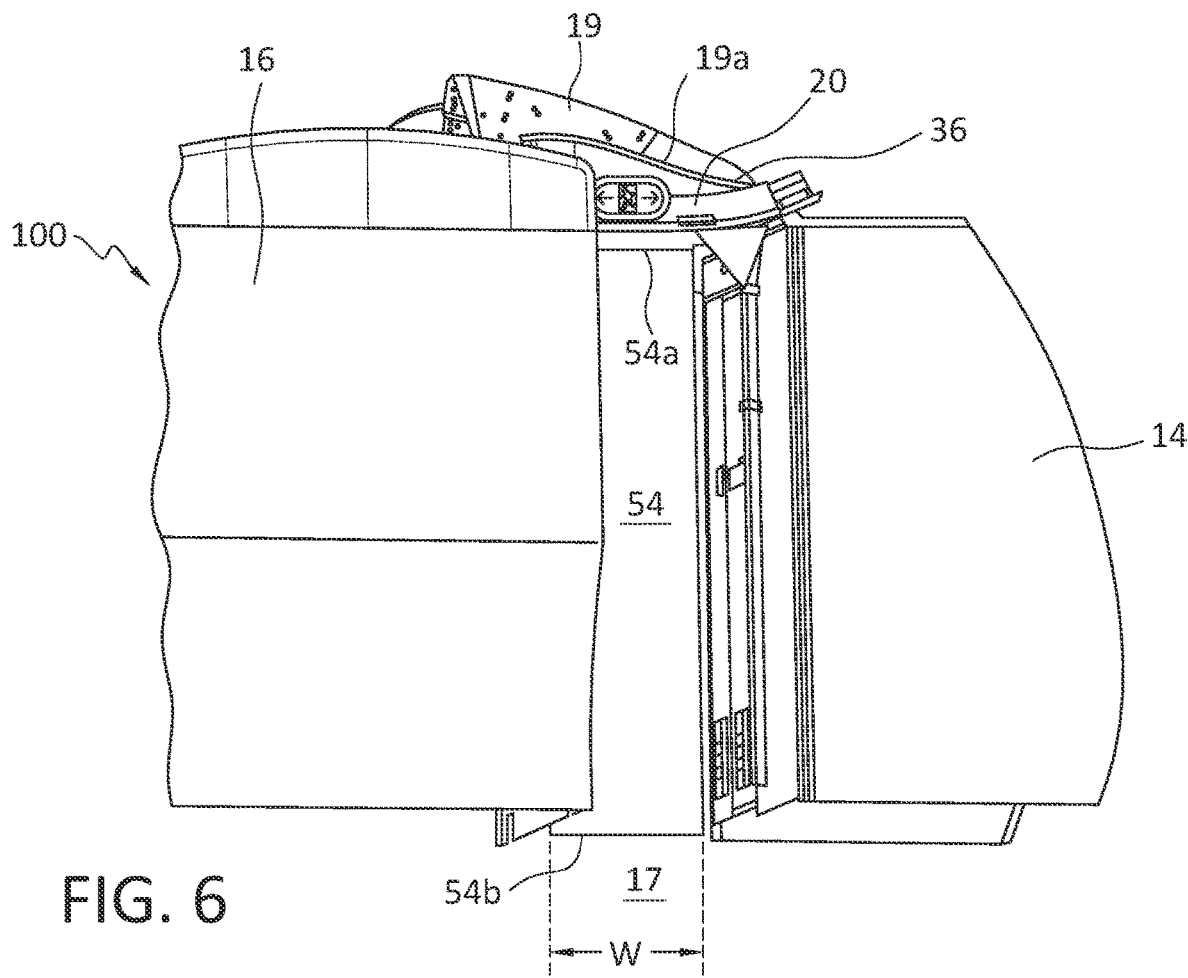
Figure 7:
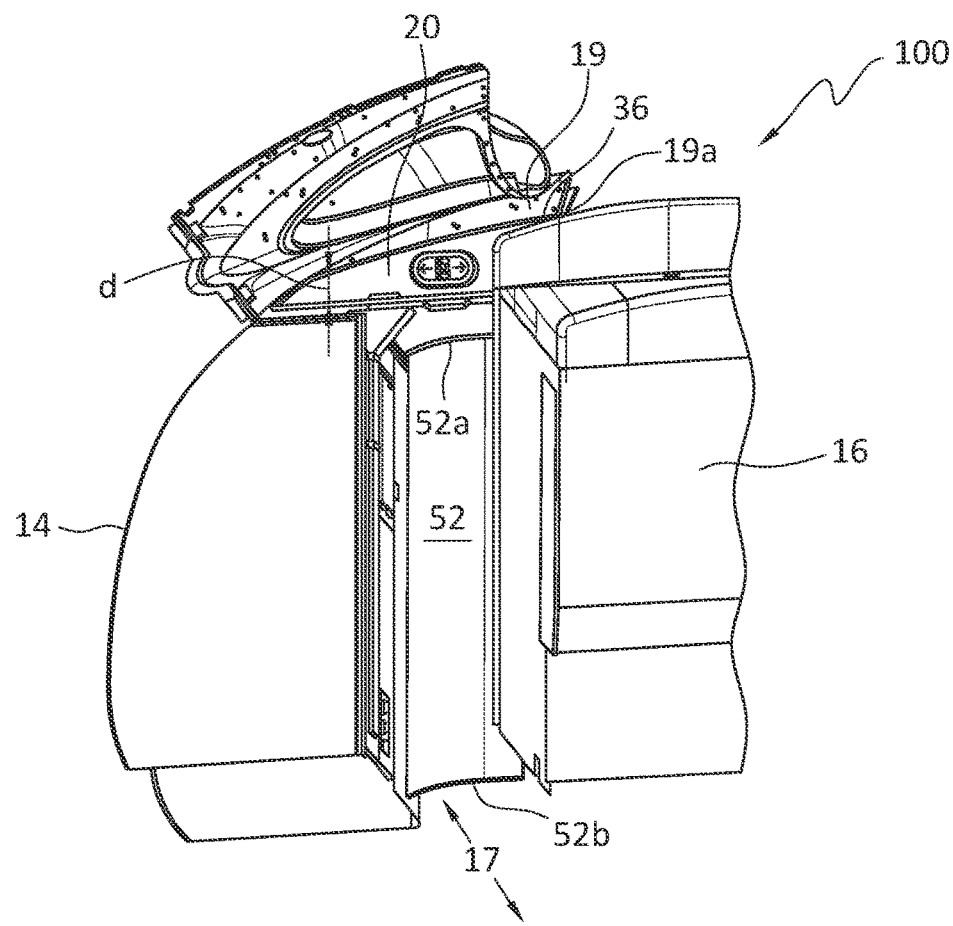
Figure 8:
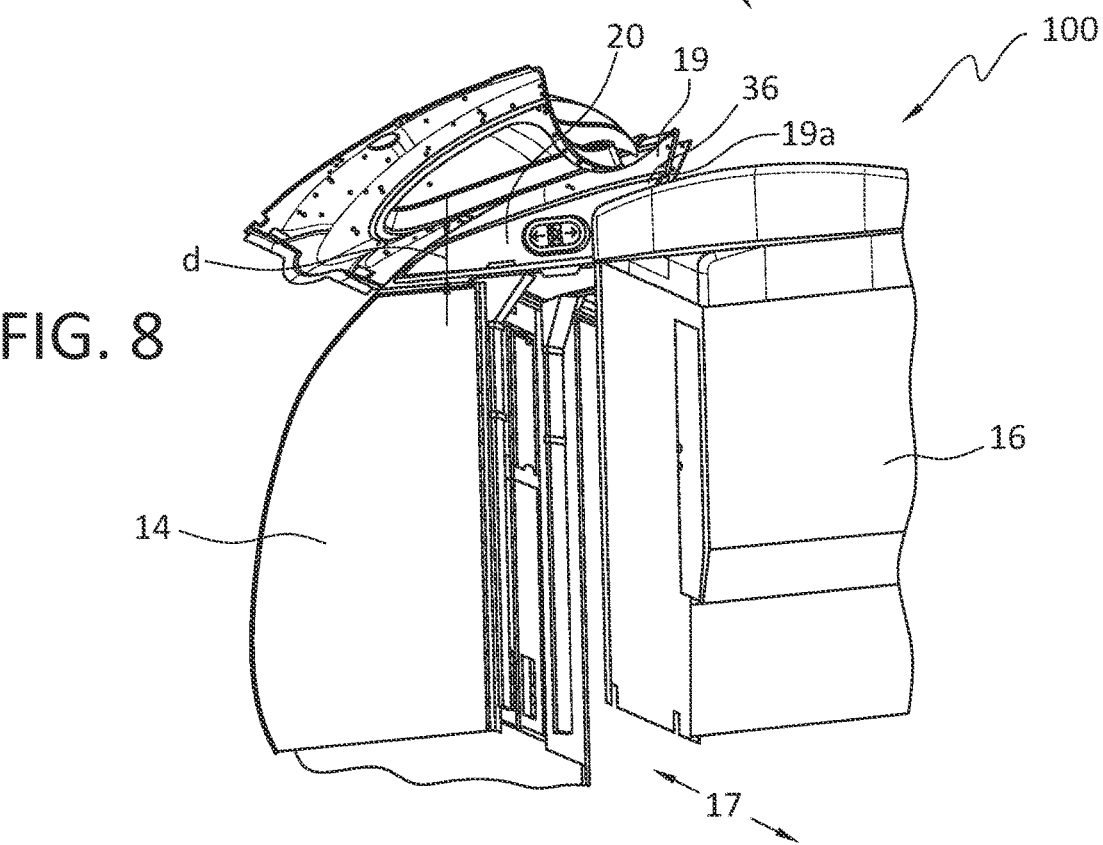
Figure 9:
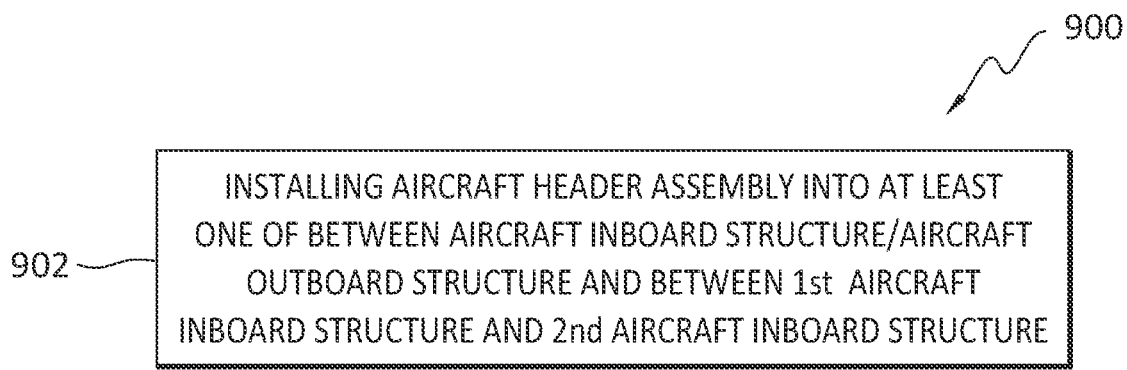
Figure 10:
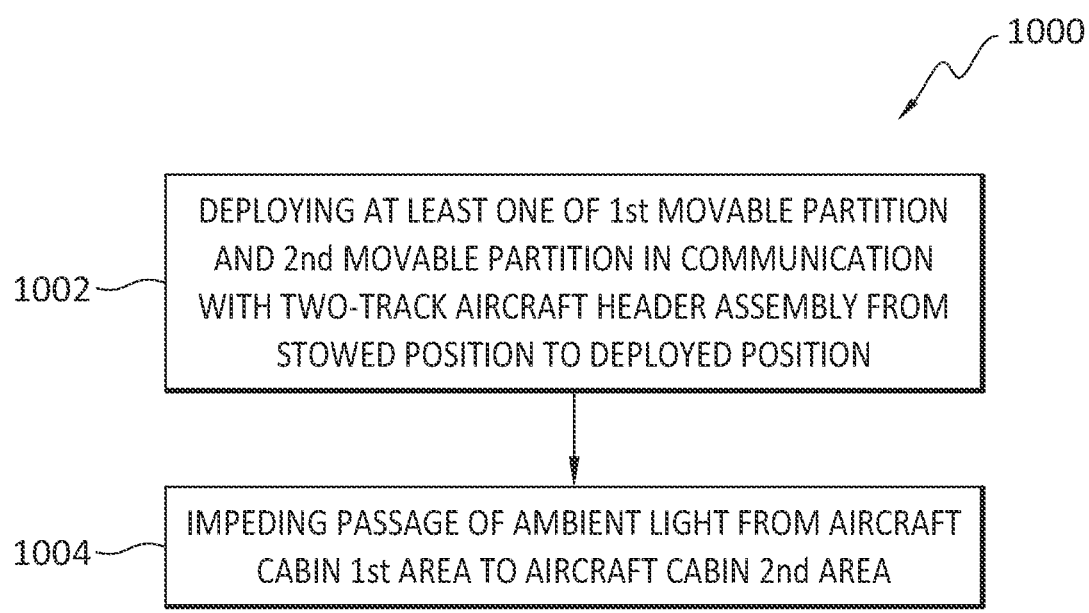

Having thus described variations of the disclosure in general terms, reference will now be made to the accompanying drawings, which are not necessarily drawn to scale, and wherein:

FIG. 1 is an illustration of an aircraft, according to present aspects;

FIG. 2A is an exposed overhead plan view of an aircraft, according to present aspects;

FIG. 2B is an enlarged, exposed overhead plan view of an aircraft, according to present aspects;

FIG. 3 is a perspective view of a located header assembly, according to present aspects;

FIG. 4A is perspective view from beneath, and an underside view of, a dual track header assembly, according to present aspects;

FIG. 4B is perspective view from beneath, and an underside view of, an alternative dual track header assembly, according to present aspects;

FIG. 5 is an over plan view showing a top view of the dual track header assembly, according to present aspects;

FIG. 6 is a perspective view of a header assembly installed in position an aircraft cabin of an aircraft, according to present aspects;

FIG. 7 is a perspective view of a header assembly installed in position an aircraft cabin of an aircraft, according to present aspects;

FIG. 8 is a perspective view of a header assembly installed in position an aircraft cabin of an aircraft, according to present aspects;

FIG. 9 is a flowchart outlining a method according to present aspects;

FIG. 10 is a flowchart outlining a method according to present aspects; and

Figure 11:
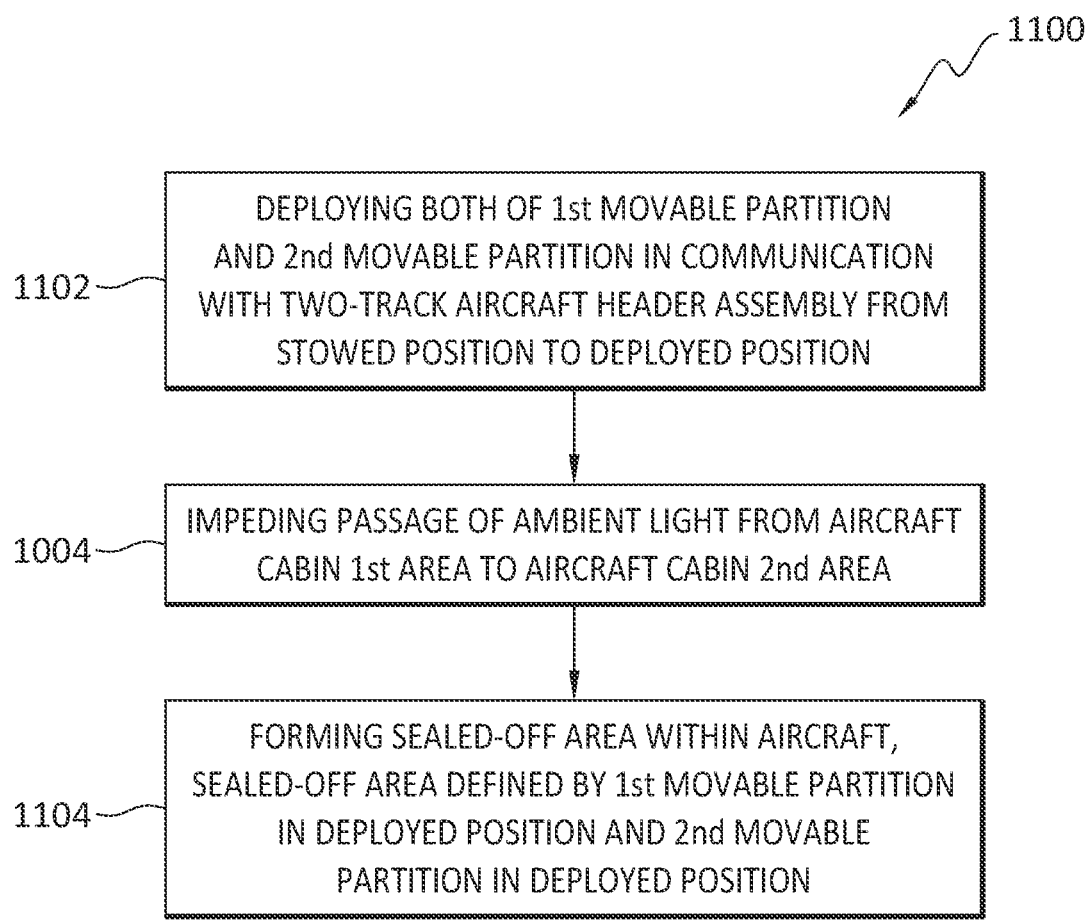

FIG. 11 is a flowchart outlining a method according to present aspects;

DETAILED DESCRIPTION

Present aspects are directed to header assemblies and aircraft cabin assemblies incorporating such header assemblies that significantly improve light-blocking and light-regulating capabilities aboard, for example, passenger aircraft. The light-blocking header assemblies, according to present aspects can be positioned at transitional regions within an aircraft, where such transitional regions or transitional areas can separate a transition from, for example, one cabin type to another adjacent cabin type, including, for example, first class, business class, etc. Such transitional areas can include, for example, crew work areas including for, example, galleys, unoccupied areas containing other aircraft monuments such as, for example, storage areas, closets, lavatories, and structures that can be adjacent to an aircraft cabin aisle, etc. According to present aspects, when the present header assemblies are incorporated into aircraft cabin assemblies, the header assemblies are referred to equivalently herein as "aircraft header assemblies".

The term "light-blocking does not necessarily mean that all light is impeded or curtailed. For example, small beams of light may pass through small pinholes, seams, or the like of the presently disclosed components of the aircraft cabin assemblies and header assemblies, according to present aspects. Accordingly, for present purposes, the term "light-blocking" includes "light-limiting" operations. According to present aspects, header assemblies are disclosed that are configured to block or otherwise limit passage of light from one interior region or area of an aircraft cabin to another adjacent aircraft cabin region or area. Presently disclosed header assemblies are sturdy, robust, and aesthetically complementary with aircraft cabin fixtures, in that they can contour and blend with inboard and outboard cabin structures (such as, through smooth or arcuate transitions, etc.). The header assemblies and their component parts can be formed of a solid, non-porous material such as a composite material that can further be a unitary piece or that can include a multiple piece construction configured to assemble in an intimate fit that can further include seals or sealing strips that can overlay or otherwise be applied to interfaces between assembled pieces.

As used herein, the term "outboard" means a position within the aircraft cabin that is further away from a central vertically-oriented longitudinal plane of a fuselage of an aircraft than another component. The term "inboard" means a position that is closer to the central vertically-oriented longitudinal plane of the fuselage of the aircraft than another component. For example, an overhead bin connected to an interior aircraft cabin wall that can define windows is "outboard" in relation to an aircraft aisle. Aircraft cabin monuments near the center of the aircraft cabin would be "inboard" of the outboard walls of the aircraft cabin, etc.

The header assemblies, according to present aspects, are configured to intimately engage (referred to equivalently herein as and "sealingly engage") adjacent surfaces of inboard and outboard structures located in an aircraft cabin such as, a ceiling, bin frame, monument, etc. The present header assemblies can comprise a composite material such as, for example, a fiberglass-containing material that can block, prevent, or otherwise limit light from passing therethrough. Present header assemblies can be a unitary, or one-piece, construction, or the present header assemblies can be made from by combining multiple pieces, and that further can comprise or otherwise include a "sandwich, for example, a material or a structure including, for example, a honeycomb structural core material, etc. Accordingly, present aspects contemplate header assemblies made from a material that can be similar to or different from materials used to make internal aircraft cabin walls, ceilings, etc.

FIG. 1 shows a representative a non-limiting illustration of an aircraft 10 that can be a passenger aircraft. Aircraft 10 comprises a fuselage 11 having a fuselage exterior and a fuselage interior, with an aircraft cabin 12 (shown in detail in FIGS. 2A, 2B) located within and defined at least in part by the aircraft fuselage interior. FIG. 2A shows a cross-sectional and exposed overhead plan view of the aircraft 10 that can be of the type shown in FIG. 1, with the cross-sectional view shown in FIG. 2A taken along line 2-2, as shown in FIG. 1.

FIG. 2A further shows a representative and non-limiting aircraft cabin arrangement within an aircraft cabin 12 that comprises aircraft cabin outboard structures 14 with a portion of the aircraft cabin outboard structures 14 positioned proximate to an aircraft cabin wall that can be positioned proximate to an aircraft fuselage interior. As shown in FIG. 2A (and as shown in greater detail in FIG. 2B) the aircraft cabin outboard structure 14 is spaced a selected distance from, and, for example, across an aisle from, an aircraft cabin inboard structure 16. A header assembly 20 is positioned between an aircraft cabin outboard structure 14 and an aircraft cabin inboard structure 16 that both are adjacently spaced apart from one another by an aircraft aisle 17 (further shown is FIG. 6 as having an aisle width, "w"). As shown in FIG. 2A, aircraft cabin inboard structure 16 can be a monument such as, for example, a galley, a lavatory, etc., with aircraft inboard structure 16 located adjacent the inboard side of aircraft aisle 17. Further, aircraft cabin outboard structure 14 can be, for example, a separating wall or other structure located adjacent to the outboard side of aircraft aisle 17.

FIG. 2B is an enlarged view representing the cross-sectional overhead plan view of the type of aircraft having a cabin configuration that can be similar to, but not necessarily identical to, that shown in FIG. 2A. As shown in FIG. 2B the aircraft 10, comprises an aircraft cabin 12 located within aircraft fuselage 11. Aircraft cabin monuments and monument types referred to herein and shown in, in non-limiting fashion, in FIG. 2A, are shown in greater detail in FIG. 2B. More particularly, FIG. 2B shows aircraft outboard structures 14 spaced a selected distance from, and across an aisle from, aircraft cabin inboard structures 16. Header assemblies 20 are associated with an aircraft inboard structure 16 and an aircraft outboard structure 14, with a header assembly 20 positioned between an aircraft cabin outboard structure 14 and an aircraft cabin inboard structure 16 that are adjacently spaced from one another by an aircraft aisle 17, and shown is FIG. 6 as having an aisle width "w". As shown in FIG. 2B, the aircraft cabin inboard structures 16 can be a monument shown as an aircraft galley component 18a such as, for example, a galley. Aircraft inboard structures 16 further can be a monument such as a lavatory 18b, etc., with aircraft inboard structure 16 located adjacent the inboard side of aircraft aisle 17.

As further shown in FIG. 2B, aircraft cabin outboard structure 14 can be, for example, a separating wall or other structure located adjacent to the outboard side of aircraft aisle 17. As further shown in FIG. 2B header assemblies 20 are shown comprising a first movable partition 52 and a second movable partition 54, with first and second movable partitions 52, 54, extending longitudinally downward from the header assembly located adjacent an aircraft ceiling, and extending downward from the header assembly 20 the full length of adjacent aircraft cabin inboard and aircraft cabin outboard structures, and with the length of first and second movable partitions 52, 54, extending to and terminating at a location at or near the aircraft aisle 17 (located for example at the aircraft cabin "floor"). The views of deployed first and second movable partitions 52, 54 are shown in greater detail in FIGS. 6 and 7, and described herein. FIG. 2B further shows a sealed-off area 53 that is "created" when the first and second movable partitions 52, 54 are deployed into a deployed configuration from a stowed configuration.

FIG. 3 is a perspective illustration looking slightly upward at presently disclosed aircraft cabin assembly 100 comprising a header assembly 20 located in position between and immediately adjacent to aircraft outboard structure 14 and aircraft inboard structure 16. As further shown in FIG. 3, the top of the header assembly 20, when located in position, rests adjacent aircraft cabin ceiling 19 to form the heading assembly/aircraft cabin ceiling interface 19a. Header assembly 20 comprises a base panel 24, with base panel 24 comprising the visible base panel first side 24a (that is exposed to and otherwise faces into the aircraft cabin 12) and base panel second side (not visible in FIG. 3) that faces toward the interior of an aircraft fuselage 11. As explained more fully herein, base panel first side 24a can further comprise a base panel first side cover such that together the base panel first side 24a and any base panel first side cover that is incorporated are together considered to be base panel first side 24a.

In an additional aspect of the present disclosure, base panel 24 of header assembly 20, as shown in FIG. 3, can further comprise a base panel through opening 30 that extends through the thickness of base panel 24. Base panel through opening 30 can incorporate a cover 31 that can disengage from base panel through opening 30, for example, on demand. Base panel first side 24a further shows first track 28a and second track 28b that are fashioned into base panel 24 or base panel first side 24a, as base panel first and second recesses (not shown in the FIGs. as separate features, but are presently understood to form the recess for and otherwise coincide with first and second tracks 28a, 28b, respectively) and, for example, with tracks 28a, 28b forming "channels" that can incorporate flanges located about the perimeter of the first and second tracks 28a, 28b, with said first track and said second tracks 28a, 28b referred to equivalently herein and respectively as "first channel" and "second channel". As described herein, and as according to present aspects, the recesses that are fashioned into the base panel first side 24a (through any selected and useful machining method) can be further fitted (e.g., with flanges, seals, protective fittings, etc.) in the location of the recesses to form the first and second tracks 28a, 28b, or "channels"; or the recesses themselves can be machined in one or more steps to suitably form the tracks without additional machining, fabrication, alteration, etc.

FIGS. 4A and 4B are an enlarged plan views of two variations of header assembly 20, showing the base plate first side 24a of base plate 24 (the side of the base plate that would be viewable as the exposed "underside" of base plate 24 that faces the interior of an aircraft cabin). As shown in FIGS. 4A and 4B, header assembly 20 comprises a main body 22 in contact with base plate 24 that can be attached to main body 22, or that can be integral with main body 22 as, for example, a unitary piece. Base plate 24, as shown in FIGS. 4A and 4B comprises first track 28*a* shown in an arcuate geometry and spaced a selected distance apart from second track 28*b* shown having a linear geometry.

The first track 28*a* and second track 28*b* can comprise a size and shape different than that shown in FIGS. 4A and 4B. For example, one or both of the first and second tracks 28*a*, 28*b* can be straight (e.g., linear), or arcuate or "c-shaped". That is, according to present aspects, at least one of the first track and second track in the dual track header assemblies disclosed herein can comprise a linear geometry that can resemble, for example, a straight line. In addition, according to present aspects, at least one of the first track and second track can comprise an arcuate geometry. The term "arcuate geometry" can be any curved form or geometry that comprises at least a portion of a curve, and that can be partially curved, or "arcuate" and can also comprise linear sections in contact with the arcuate geometry sections. In addition, according to present aspects one of the tracks can comprise a linear geometry, with the other track comprising an arcuate geometry. That is, according to present aspects the first track can comprise a linear geometry and the second track can comprise an arcuate geometry, and vice versa.

As shown in FIG. 4A, base plate 24 further comprises a through opening 30 extending through the thickness of base plate 24 and shown as a rectangular through opening. Base panel through opening cover 31 is shown engaged to "fill" through opening 30 (e.g., engaged via a frictional fit, etc.) and that can be removed from the through opening on demand to expose the through opening 30. FIG. 4B shows a variation, according to present aspects, for header assembly 20 that does not include through opening 30 and through opening cover 31, as shown in FIG. 4A (that is located between first track 28*a* and second track 28*b*).

As further shown in FIGS. 4A and 4B, header assembly 20 can be formed into any selected overall shape or configuration that will match aircraft cabin aesthetics and otherwise afford the header assembly a close fit with adjacent aircraft ceiling, adjacent aircraft inboard structure, and adjacent outboard structure when the header assembly is installed into position adjacent the aircraft cabin ceiling. In addition, according to present aspects, the presently disclosed header assemblies can comprise a main body and base plate that is made from an opaque material. According to present aspects, the term "opaque" refers to a material property connoting that the material will not allow the passage of light through the material, and that therefore the opaque material "blocks" the passage of light through the material. The header assembly 20 can be made from any material having selected strength and weight attributes and can be for example, a plastic material, a composite material, etc., that can be solid or that can be filled with a filler material to influence strength characteristics, soundproof characteristics, etc., of the header assembly including, for example, honeycomb core panel structural material, etc.

FIG. 5 is an overhead plan view of the header assembly 20 of the type as shown in FIG. 4A, with FIG. 5 showing the base plate second side 24*b* that would not be viewable from the aircraft cabin. That is, base plate second side 24*b*, when installed in position within aircraft cabin assembly 100 as shown at in FIGS. 6, 7, 8, would rest proximate to the aircraft cabin ceiling or structural components in communication with and that can otherwise support, an aircraft ceiling.

FIG. 5 further shows a four anchoring members 42*a*, 42*b*, 42*c*, 42*d* arranged in a rectangular orientation with respect to one another (e.g., a parallelogram as indicated by the connected "dotted" lines in FIG. 5). While FIG. 5 shows four anchoring members 42*a*, 42*b*, 42*c*, 42*d*, present aspects contemplate the incorporation of four or more anchoring members into header assembly 20. Further, anchoring members 42*a*, 42*b*, 42*c*, 42*d* are configured to engage with and/or otherwise mate with attachments at attachment points (not shown in FIG. 5) that are in contact with and/or otherwise attached to an aircraft cabin ceiling, or in contact with and/or attached to a structural support than can be in communication with and that can also support an aircraft cabin ceiling.

As shown in FIG. 5, the four or more anchoring members 42*a*, 42*b*, 42*c*, 42*d* (also referred to equivalently herein as "fasteners") can include various fastener types (including, for example, a bayonet that can comprise a post, cylinder, pin, stud, etc.) configured to engage a correspondingly positioned mating element (such as, for example, a pin bracket, or other latching or "mating" mechanism, etc.) to secure the header assembly in place at a location as described herein. A pin-and-grommet type connection between the header assembly and an internal structure (e.g., ceiling, or beam support, or other supporting structure located above or coincident with a ceiling, etc.) that can, for example, eliminate, minimize, or otherwise reduce shared forces. The multiple, and preferably four anchoring locations comprising the four or more anchoring members 42*a*, 42*b*, 42*c*, 42*d* that are located on the header assembly base panel second side 24*b* are selected to provide the header assembly with a robust, safe, and secure and intimate connection or attachment adjacent inboard and outboard structures, and ceiling components within an aircraft cabin.

FIG. 5 further shows the base panel through opening 30, with an oxygen supply assembly 32 shown in a location that can resting adjacent to, or that can be located a close distance away from, the base panel through opening 30, and with the oxygen supply assembly in communication with an oxygen drop down delivery device 34 that is shown in position immediately adjacent to and within the perimeter of the base panel through opening 30. In operation, in response to an aircraft cabin event requiring oxygen deployment, the base panel through opening cover 31 (as shown in FIG. 4A) is caused to be disengaged from the base panel through opening, for example in response to an actuating device (not shown), on demand, with the oxygen drop down delivery device 34 dimensioned to be released from a position adjacent the base panel second side such that the oxygen drop down delivery device 34 can pass freely or otherwise be directed through the now unobstructed base panel through opening 30 and "drop" through the header assembly 20 to a location descending from the header assembly 20 and remaining in communication with the oxygen supply assembly 32 that can contain the oxygen supply, or that is otherwise in communication with a further oxygen supply.

Returning to FIGS. 4A and 4B, first track 28*a* and second track 28*b* formed in recesses in the base plate first side 24*a* are configured to engage with movable partitions that can deploy along and within the first and second tracks 28*a*, 28*b*. FIGS. 6, 7, 8 show header assembly 20 incorporated into aircraft cabin assembly 100 and comprising a first movable partition 52 engaged with first track 28*a* and a second movable partition 54 engaged with second track 28*b*, and with the first and second movable partitions 52, 54 configured to extend longitudinally from the header assembly 20 located adjacent an aircraft ceiling, and extending downward from the header assembly 20 the full length of adjacent aircraft inboard and aircraft outboard structures, and extending to and terminating at a location at or near the aircraft aisle 17 (e.g., the aircraft cabin "floor", etc.).

As shown in FIG. 6, header assembly 20 is installed into an aircraft cabin assembly 100. Header assembly is shown installed immediately adjacent to aircraft cabin ceiling 19 to form a header assembly/aircraft cabin ceiling interface 19a. Header assembly is further shown positioned between aircraft cabin outboard structure 14 and aircraft cabin inboard structure 16, with optional seal 36 shown positioned at the header assembly/aircraft cabin ceiling interface 19a. As further shown in FIG. 6, a second movable partition 54 is suspended from track 28b of header assembly 20 at or near the second movable partition first end 54a, with second movable partition 54 extending longitudinally downward from second movable partition first end to the second movable partition second end 54b that is proximate to the aircraft floor surface of aisle 17.

As shown in FIG. 6, the second movable partition 54 is in a deployed position such that the second movable partition 54 "blocks" the pathway represented by aircraft cabin aisle 17. That is, in the deployed position, the deployed second movable partition 54 is positioned substantially perpendicular to aircraft cabin aisle 17, blocking further passage along aircraft aisle 17. To further clarify the viewed position of the aircraft cabin assembly in position within, for example, an aircraft cabin as viewed in FIG. 6, the aircraft cabin assembly 100 is viewed from the perspective of a person within the aircraft cabin looking "forward" and seeing a first side of the aircraft cabin assembly 100.

FIG. 7 shows an opposite view of the aircraft cabin assembly 100 shown in FIG. 6, as evidenced by the reversed viewed positioning of the aircraft outboard structure 14 (now located to the right of header assembly 20 and aircraft cabin aisle 17), and the aircraft inboard structure 16 (now located to the left of header assembly 20 and aircraft cabin aisle 17). As shown in FIG. 7, header assembly 20 is installed into an aircraft cabin assembly 100. Header assembly is shown installed immediately adjacent to aircraft cabin ceiling 19 to form a header assembly/aircraft cabin ceiling interface 19a. Header assembly 20 is further shown positioned between aircraft cabin outboard structure 14 and aircraft cabin inboard structure 16. As further shown in FIG. 7, a first movable partition 52 is suspended from track 28a of header assembly 20 at or near the first movable partition first end 52a, with second movable partition 52 extending longitudinally downward from first movable partition first 52a end to the first movable partition second end 52b that is proximate to the aircraft floor surface of aisle 17. Seal 36 is shown affixed to header assembly 20 at the header assembly/aircraft cabin ceiling interface 19a.

As shown in FIG. 7, the first movable partition 52 is in a deployed position such that the second movable partition 52 "blocks" the pathway represented by aircraft cabin aisle 17. That is, in the deployed position, the deployed first movable partition 52 is positioned substantially perpendicular to aircraft cabin aisle 17, blocking further passage along aircraft aisle 17. To further clarify the viewed position of the aircraft cabin assembly in position within, for example, and aircraft cabin, if FIG. 7 shows a view of the aircraft cabin assembly 100 from the perspective of a person looking aft, the aircraft cabin assembly 100 would be the view a passenger on the other side of the aircraft cabin assembly 100 looking "aft" from within the aircraft cabin and viewing the second side of the aircraft cabin assembly 100.

According to present aspects, the first and second movable partitions are dimensioned such that, when either of the first or second movable partitions 52, 54 are deployed, a significant amount of light passage from a cabin area on one side one side of a deployed movable partition is blocked from passing into an aircraft cabin region on the other side of the deployed movable partition. In addition, when both the first movable partition and the second moveable partition are deployed, any residual light passage that could occur around the unsealed edges of a single deployed movable partition is further significantly impeded by deploying both the first and the second movable partitions 52, 54 into the deployed position.

The first and second moveable partitions 52, 54 that extend longitudinally downward from the header assembly tracks 28a, 28b all the way to the floor surface of an aircraft cabin aisle 17 have a deployed width that is at least equal to the width of the aircraft cabin aisle 17. That is, if an aircraft cabin aisle width is 30 inches, the width of each of the first and the second movable partitions in the deployed state will also be at least about 30 inches. Since the movable partitions can be made from any opaque material that can be any suitable flexible and opaque material that can include, for example, a foldable or pliable plastic material, fabric material (e.g. an opaque curtain-like material), reinforced fabric material, composite material, and combinations thereof, the actual width of the first and/or second moveable partitions can have a deployed width that exceeds the actual width of the aircraft cabin aisle.

The first and second movable panels 52, 54 can be made from a unitary piece that is opaque, flexible, and that can deploy and stow as described herein. In addition, according to present aspects, the first and second movable panels 52, 54 can be made from a multi-segment construction with alternating sections that can fold, for example, in alternating, foldable, accordion-like fashion. Present aspects further contemplate multi-segment panels having a plurality of seals applied to segment interfaces to insure that the panels block light. The presently disclosed panels can further be flexible opaque sheets of material that can flexibly roll and unroll into stowed and deployed states.

Referring to FIGS. 4A and 4B again, the header assembly 20 can be dimensioned such that the first and second tracks 28a, 28b are separated from one another by an average distance of from a few feet up to several feet, and up to a non-limiting distance ranging from about 2 feet to about 10 feet. Since the movable partition first ends 52a, 54a engage the first and second tracks 28a, 28b respectively, the movable partitions 52, 54 are also separated from one another by the same average distance. Accordingly, in the deployed state, when both the first movable partition and the second movable partition are deployed, an area within and between the two deployed moveable partitions can be established that is bounded by and at least partially defined by the deployed moveable partitions, the aisle floor, the header assembly base panel first side, and aircraft monument walls or fixtures. That is, when both movable partitions are deployed, an enclosed area can be formed within and between the partitions.

The establishment of such an enclosed area 53 in an aircraft cabin (referred to equivalently herein as an "established enclosure" and/or an "established enclosed area" and shown in FIG. 2B in the overhead plan view of the aircraft cabin) that can accommodate, even temporarily, a passenger or crew member (e.g., a passenger emerging from a lavatory that is located within the established "enclosure" or "enclosed area", and/or a crew member working within a galley area that is located within the established "enclosure" or enclosed area", etc.) can require the presence of a drop down oxygen supply within such enclosed area, in case of emergency. According to present aspects, as shown in FIGS. 3 and 4A, header assembly 20 comprises an oxygen supply assembly 32 further comprising an oxygen drop down deliver device that is dimensioned to descend, if needed and on demand, from an initial location on or above the base panel second side 24b through the base panel through opening 30 (once the base panel through opening cover 31 has been released to expose the base panel through opening 30), with the oxygen drop down delivery device configured to extend a selected distance downward and into the established enclosure or enclosed area 53 and remain suspended from and otherwise in communication with the oxygen supply assembly comprising an oxygen supply.

When both the first and second movable partitions are in a stowed configuration (e.g., not deployed or partially deployed) the first and second movable partitions can be retracted as the partitions are moved through a range of motion established by, allowed by, and restricted by the dimensions and geometry of the first and second tracks in the base panel first side of the header assembly.

The first and second tracks can be dimensioned and otherwise configured to directly receive and otherwise "mate" with the first and second movable partition first ends, respectively. In addition, the first and second tracks can be configured to receive, mechanisms (movable bearings or other movable mechanisms) that can attach to or receive assemblies that mate with mechanisms within the tracks that are directly or indirectly in communication with the first and second movable partition first ends.

As shown in FIG. 8, when the movable partitions are retracted and otherwise configured to be in the stowed configuration, the aircraft cabin aisle 17 is unimpeded to travel along the aisle and through the aircraft cabin assembly 100, and with the movable partitions in the stowed configuration light that would otherwise be blocked from passing through the aircraft cabin assembly (e.g., when the first and second movable partitions are deployed, etc.) can freely pass, unimpeded between and among cabin areas that are located on either side of the header assembly and aircraft cabin assembly comprising the header assembly.

FIGS. 7 and 8 further show that header assembly 20 can have a width represented as a distance "d" extending from the header assembly/aircraft cabin ceiling interface 19a to the region of the header assembly farthest from the header assembly/aircraft cabin ceiling interface 19a and that can aesthetically appear as an extension or appear as a part of, for example, either or both of the adjacent and adjoining aircraft cabin outboard structure 14 and aircraft cabin inboard structure 16.

Although not specifically shown in the FIGs., the present header assemblies can be configured to pivot from a secured position to facilitate maintenance or removal, or installation. In such a configuration, a selected number of the fasteners may be selectively disengaged, while other of the fasteners may be remain in an engaged position to allow the header assembly to pivot, for example, in a downward motion away from the aircraft cabin ceiling.

FIGS. 9, 10, and 11 are flowcharts illustrating present methods according to present aspects, with the methods outlined in FIGS. 9, 10, 11 employing the header assemblies, aircraft cabin assemblies, and aircraft comprising the header assemblies and aircraft comprising the aircraft cabin assemblies as shown in the accompanying FIGs and as disclosed herein.

FIG. 9 outlines, according to present aspects, a method 900 for impeding light passage from a first aircraft cabin area to a second aircraft cabin according to present aspects, with the method 900 including installing 902 an aircraft header assembly between an aircraft cabin inboard structure located within an aircraft cabin, said aircraft cabin inboard structure positioned adjacent to an aircraft cabin aisle, with an aircraft cabin outboard structure located within the aircraft cabin, with the aircraft cabin outboard structure positioned adjacent to the aircraft cabin aisle, with the outboard structure separated by the aircraft cabin aisle within the said aircraft cabin, and with the aircraft cabin aisle comprising an aircraft aisle width. The header assembly is dimensioned to abut the aircraft cabin inboard structure, said header assembly further dimensioned to abut the aircraft cabin inboard structure, said header assembly further dimensioned to abut aircraft cabin ceiling between the aircraft cabin inboard structure and the aircraft cabin outboard structure to form a header assembly/aircraft cabin ceiling interface between the aircraft cabin ceiling and said header assembly. The header assembly includes a main body, with the main body formed from a solid and non-porous material. The main body includes a base panel, with the base panel including a base panel first side, a base panel second side, and with the base panel including a base panel thickness. The base panel first side is exposed to and otherwise faces into an aircraft cabin. The base panel first side includes a plurality of recesses, with the plurality of recesses configured to form at least a first track and a second track, with the first track and the second track spaced a selected distance apart from one another. The header assembly further includes a first movable partition configured to movably engage and extend downward from the first track and a second movable partition configured to moveable engage and extend downward from the second track. The method further includes deploying at least one of the first movable partition and the second movable partition from a stowed position to a deployed position, and impeding passage of ambient light from one aircraft cabin area to a second aircraft cabin area.

According to present aspects, the base panel can further include a base panel through opening, with the base panel through opening configured to extend through the base panel thickness, with the base panel through opening positioned between the first track and second track. Methods outlined in FIG. 9, according to present aspects, can employ the header assemblies and aircraft cabin assemblies described herein and shown at least in FIGS. 2A, 2B, 3, 4A, 4B, 5, 6, 7, and 8, and as further disclosed herein.

FIG. 10 outlines a method for impeding light passage from a first aircraft cabin area to a second aircraft cabin, according to present aspects, with a method 1000 including deploying 1002 at least one of the first movable partition and the second movable partition from a stowed position to a deployed position, and impeding 1004 passage of ambient light from one aircraft cabin area to a second aircraft cabin area. Methods outlined in FIG. 10, according to present aspects, can employ the header assemblies and aircraft cabin assemblies described herein and shown at least in FIGS. 2A, 2B, 3, 4A, 4B, 5, 6, 7, and 8, and as further disclosed herein.

FIG. 11 outlines a method for impeding light passage from a first aircraft cabin area to a second aircraft cabin, according to present aspects, with a method 1100 including deploying 1102 both least one of the first movable partition and the second movable partition from a stowed position to a deployed position, and impeding 1004 passage of ambient light from one aircraft cabin area to a second aircraft cabin area, and forming 1104 a sealed-off area or enclosure within the aircraft cabin, with the sealed-off area defined by the first movable partition in the deployed position and the second movable partition in the deployed position. Methods outlined in FIG. 11, according to present aspects can employ the header assemblies and aircraft cabin assemblies described herein and shown at least in FIGS. 2A, 2B, 3, 4A, 4B, 5, 6, 7, and 8, and as further disclosed herein.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A dual track light-limiting header for maintaining ambient light levels between adjacent aircraft interior cabin regions, the dual track light-limiting header comprising:
   a dual track light-limiting header assembly, said dual track light-limiting header assembly dimensioned to abut an aircraft cabin inboard structure and further dimensioned to abut an aircraft cabin outboard structure, said dual track light-limiting header assembly further configured to be positioned adjacent to an aircraft cabin ceiling located within an aircraft aisle to form a dual track light-limiting header assembly aircraft/cabin ceiling interface, said aircraft aisle having an aisle width, and said dual track header assembly/aircraft cabin ceiling interface further positioned over the aisle width, said dual track light-limiting header assembly comprising:
      a light-limiting main body said light-limiting main body formed of a solid non-porous material, said light-limiting main body comprising a base panel, said base panel comprising:
         a base panel first side, said base panel first side comprising a plurality of recesses, said plurality of recesses configured to form a first track and a second track, said first track and said second track spaced a selected distance from one another, said selected distance ranging from about 2 feet to about 10 feet, at least one of the first track and the second track configured to be substantially perpendicular to the aircraft cabin aisle;
         a base panel second side;
            a base panel thickness measured from the base panel first side to the base panel second side;
            a base panel through opening, said base panel through opening configured to extend through the base panel thickness, said base panel through opening positioned between the first track and second track;
      an oxygen drop down assembly positioned adjacent the base panel second side, said oxygen drop down assembly comprising an oxygen drop down delivery device;
      wherein said base panel through opening is configured to accommodate and permit passage of the oxygen drop down delivery device through the base panel through opening on demand; and
      wherein said dual track light-limiting header is configured to support a first movable partition engaged within the first track and a second movable partition engaged within the second track, and with said first movable partition and said second movable partition configured to extend longitudinally downward from the base panel first side, and with said first movable partition and said second movable partition extending to and terminating at a location at or near an aircraft cabin floor section of the aircraft aisle; and
      wherein said dual track light-limiting header is configured to allow the first movable partition to move within the first track and the second movable partition to move within the second track independently from one another in a range of positions from a fully deployed light-blocking position to a stowed position.

2. The dual track light-limiting header of claim 1, wherein the header assembly is formed from an opaque material.

3. The dual track light-limiting header of claim 1, wherein at least one of the first track and second track comprises a linear geometry.

4. The dual track light-limiting header of claim 1, wherein at least one of the first track and second track comprises an arcuate geometry.

5. The dual track light-limiting header of claim 1, wherein the first track comprises a linear geometry and the second track comprises an arcuate geometry.

6. The dual track light-limiting header of claim 1, wherein the header assembly is configured to contact the aircraft cabin ceiling, said header assembly further configured to extend a selected distance from the aircraft cabin ceiling between the aircraft cabin inboard structure and the aircraft cabin outboard structure.

7. The dual track light-limiting header apparatus of claim 1, said base panel second side comprising at least four anchoring members, said at least four anchoring members configured to attach the header assembly to a support structure, said support structure positioned proximate to the base panel second side, said support structure further comprising at least four attachment points, each of said four attachment points configured to engage with one of the at least four anchoring members.

8. An aircraft comprising the dual track light-limiting header of claim 1.

9. An aircraft cabin assembly comprising:
   an aircraft cabin inboard structure located within an aircraft cabin, said aircraft cabin inboard structure adjoining an aircraft cabin aisle;
   an aircraft cabin outboard structure located within the aircraft cabin, said aircraft cabin outboard structure adjoining the aircraft cabin aisle, said aircraft cabin outboard structure configured to be positioned at a selected distance from the aircraft cabin inboard structure, said aircraft cabin outboard structure separated from said aircraft cabin inboard structure by the aircraft cabin aisle, said aircraft cabin aisle comprising an aisle width;
   a dual track header assembly, said dual track header assembly dimensioned to abut the aircraft cabin inboard structure, said dual track header assembly further dimensioned to abut the aircraft cabin inboard structure, and said dual track header assembly further dimensioned to abut an aircraft cabin ceiling to form a dual track header assembly/aircraft cabin ceiling interface between the aircraft cabin ceiling and the dual track header assembly, said dual track header assembly/aircraft cabin ceiling interface further positioned over the aisle width, said dual track header assembly comprising;
      a main body said main body formed of a solid non-porous material, said main body comprising a base panel, said base panel comprising a base panel first side, a base panel second side, and a base panel thickness, said base panel first side comprising a plurality of recesses, said plurality of recesses configured to form a first track and a second track, said first track and said second track spaced a selected distance from one another, said selected distance ranging from about 2 feet to about 10 feet, at least one of the first track and the second track configured to be substantially perpendicular to the aircraft cabin aisle;
a first movable partition configured to movably engage and extend downward from the first track, said first movable partition configured to be moved between a stowed configuration and a deployed configuration;
a second movable partition configured to movably engage and extend downward from the second track, said second movable partition configured to be moved between a stowed configuration and a deployed configuration; and
wherein said first movable partition in the deployed configuration and said second movable partition in the deployed configuration are configured to establish an enclosed area, said enclosed area at least partially defined by the first movable partition, the second movable partition, and an aisle floor;
wherein said dual track light-limiting header assembly is configured to support the first movable partition engaged within the first track and the second movable partition engaged within the second track, and with said first movable partition and said second movable partition configured to extend longitudinally downward from the base panel first side, and with said first movable partition and said second movable partition extending to and terminating at a location at or near an aircraft cabin floor section of the aircraft aisle; and
wherein said dual track light-limiting header assembly is configured to allow the first movable partition to move within the first track and the second movable partition to move within the second track independently from one another in a range of positions from a fully deployed light-blocking position to a stowed position.

10. The aircraft cabin assembly of claim 9, wherein the base panel further comprises a base panel through opening, said base panel through opening configured to extend through the base panel thickness, said base panel through opening positioned between the first track and second track.

11. The aircraft cabin assembly of claim 10, further comprising:
an oxygen drop down assembly positioned adjacent the base panel second side, said oxygen drop down assembly comprising an oxygen drop down delivery device;
wherein said base panel through opening is configured to accommodate and permit passage of the oxygen drop down delivery device through the base panel through opening on demand.

12. The aircraft cabin assembly of claim 9, wherein the dual track header assembly is formed from an opaque material.

13. The aircraft cabin assembly of claim 9, wherein at least one of said first movable partition and said second movable partition comprises a curtain.

14. The aircraft cabin assembly of claim 9, wherein at least one of the first track and second track comprises a linear geometry.

15. The aircraft cabin assembly of claim 9, wherein at least one of the first track and second track comprises an arcuate geometry.

16. The aircraft cabin assembly of claim 9, wherein the first track comprises a linear geometry and the second track comprises an arcuate geometry.

17. The aircraft cabin assembly of claim 9, wherein said selected distance between the aircraft cabin inboard structure and the aircraft cabin outboard structure is approximately equivalent to the aisle width.

18. The aircraft cabin assembly of claim 9, said first movable partition further comprising a first movable partition first end and a first movable partition second end, said first movable partition first end configured to be in communication with the first track of the header assembly, said first movable partition second end configured to extend a distance from the first movable partition first end, said first movable partition second end further configured to at least nearly contact an aircraft cabin floor section.

19. The aircraft cabin assembly of claim 9, said second movable partition further comprising a second movable partition first end and a second movable partition second end, said second movable partition first end configured to be in communication with the second track of the header assembly, said second movable partition second end configured to extend a distance from the second movable partition first end, said second movable partition second end further configured to at least nearly contact an aircraft cabin floor section.

20. An aircraft comprising the aircraft cabin assembly of claim 9.

21. A method for impeding light passage from a first aircraft cabin area to a second aircraft cabin area, the method comprising;
installing a dual track header assembly between an aircraft cabin inboard structure located within an aircraft cabin, said aircraft cabin inboard structure configured to be positioned adjacent to an aircraft cabin aisle, and an aircraft cabin outboard structure located within the aircraft cabin, said aircraft cabin outboard structure configured to be positioned adjacent to the aircraft cabin aisle, said aircraft cabin outboard structure separated by the aircraft cabin aisle within the said aircraft cabin, said aircraft cabin aisle comprising an aircraft aisle width, said dual track header assembly dimensioned to abut the aircraft cabin inboard structure, said dual track header assembly further dimensioned to abut the aircraft cabin inboard structure, said dual track header assembly further dimensioned to abut an aircraft cabin ceiling between the aircraft cabin inboard structure and the aircraft cabin outboard structure to form a header assembly/aircraft cabin ceiling interface between the aircraft cabin ceiling and said header assembly, said dual track header assembly/aircraft cabin ceiling interface further positioned over the aisle width, said dual track header assembly comprising;
a main body, said main body formed of a solid non-porous material, said main body comprising a base panel, said base panel comprising a base panel first side, a base panel second side, and a base panel thickness, said base panel first side comprising a plurality of recesses, said plurality of recesses configured to form a first track and a second track, said first track and said second track spaced a selected distance from one another, said selected distance ranging from about 2 feet to about 10 feet, at least one of the first track and the second track configured to be substantially perpendicular to the aircraft cabin aisle;
a first movable partition configured to movably engage and extend downward from the first track; and
a second movable partition configured to movably engage and extend downward from the second track; and deploying at least one of the first movable partition and the second movable partition from a stowed position to a deployed position substantially perpendicular to an aircraft cabin aisle;

impeding passage of ambient light from the first aircraft cabin area to the second aircraft cabin area;

wherein said dual track light-limiting header assembly is configured to support a first movable partition engaged within the first track and a second movable partition engaged within the second track, and with said first movable partition and said second movable partition configured to extend longitudinally downward from the base panel first side, and with said first movable partition and said second movable partition extending to and terminating at a location at or near an aircraft cabin floor section of the aircraft aisle; and wherein said dual track light-limiting header assembly is configured to allow the first movable partition to move within the first track and the second movable partition to move within the second track independently from one another in a range of positions from a fully deployed light-blocking position to a stowed position.

22. The method of claim 21, wherein the base panel further comprises a base panel through opening, said base panel through opening configured to extend through the base panel thickness, said base panel through opening positioned between the first track and second track.

23. The method of claim 21, further comprising:
deploying both the first movable partition and the second movable partition from a stowed configuration to a deployed configuration substantially perpendicular to an aircraft cabin aisle; and forming a sealed-off area within the aircraft cabin, said sealed-off area defined between the first movable partition in the deployed position, the second movable partition in the deployed position, and an aircraft aisle floor.

* * * * *